United States Patent
Turkki et al.

(10) Patent No.: US 11,242,654 B2
(45) Date of Patent: Feb. 8, 2022

(54) COATING STRUCTURE, SHEET-LIKE PRODUCT AND ITS USE

(71) Applicant: Kemira Oyj, Helsinki (FI)

(72) Inventors: Tarja Turkki, Helsinki (FI); Anneli Lepo, Tampere (FI)

(73) Assignee: Kemira Oyj, Helsinki (FI)

( * ) Notice: Subject to any disclaimer, the term of this patent is extended or adjusted under 35 U.S.C. 154(b) by 31 days.

(21) Appl. No.: 16/617,770

(22) PCT Filed: Jun. 14, 2018

(86) PCT No.: PCT/FI2018/050464
§ 371 (c)(1),
(2) Date: Nov. 27, 2019

(87) PCT Pub. No.: WO2018/229344
PCT Pub. Date: Dec. 20, 2018

(65) Prior Publication Data
US 2020/0190741 A1    Jun. 18, 2020

(30) Foreign Application Priority Data
Jun. 15, 2017 (FI) .................................. 20175560

(51) Int. Cl.
| | | |
|---|---|---|
| *D21H 19/82* | (2006.01) | |
| *B65D 65/42* | (2006.01) | |
| *D21H 19/20* | (2006.01) | |
| *D21H 19/40* | (2006.01) | |
| *D21H 19/54* | (2006.01) | |
| *D21H 19/58* | (2006.01) | |
| *D21H 19/64* | (2006.01) | |
| *D21H 27/10* | (2006.01) | |

(52) U.S. Cl.
CPC ............ *D21H 19/82* (2013.01); *B65D 65/42* (2013.01); *D21H 19/20* (2013.01); *D21H 19/40* (2013.01); *D21H 19/54* (2013.01); *D21H 19/58* (2013.01); *D21H 19/64* (2013.01); *D21H 27/10* (2013.01)

(58) Field of Classification Search
USPC ........................................................ 162/137
See application file for complete search history.

(56) References Cited

U.S. PATENT DOCUMENTS

| | | | |
|---|---|---|---|
| 5,763,100 | A | 6/1998 | Quick et al. |
| 5,776,619 | A | 7/1998 | Shanton |
| 2004/0241475 | A1 | 12/2004 | Morabito |
| 2007/0232743 | A1 | 10/2007 | Laviolette et al. |

FOREIGN PATENT DOCUMENTS

| | | |
|---|---|---|
| RU | 2297956 C2 | 4/2007 |
| WO | 2010114467 A1 | 10/2010 |
| WO | 2013083504 A1 | 6/2013 |
| WO | 2014005697 A2 | 1/2014 |
| WO | 2014006269 A1 | 1/2014 |
| WO | 2015003275 A1 | 1/2015 |
| WO | 2016184799 A1 | 11/2016 |

OTHER PUBLICATIONS

Finnish Patent and Registration Office, Search Report of FI20175560, dated Jan. 15, 2018, 1 page.
Russian Patent Office, Search Report of Russian Patent Application No. 2019144009, dated Apr. 6, 2021, 4 pages.

*Primary Examiner* — Mark Halpern
(74) *Attorney, Agent, or Firm* — Meunier Carlin & Curfman LLC

(57) ABSTRACT

A coating structure for a sheet-like substrate, which includes lignocellulosic fibres is disclosed. The structure includes at least one pre-coat layer including at least 70 weight-% of a first styrene (meth)acrylate copolymer polymerised in the presence of a stabiliser, having a glass transition temperature Tg ≤20° C. preferably ≤10° C., ≤30 weight-% of inorganic platy mineral particles and 0.01-2 weight-% of at least one first thickener. The coating structure further includes a top coat layer including at least 50 weight-% of a second styrene (meth)acrylate copolymer polymerised in the presence of a stabiliser having a glass transition temperature Tg ≤20° C. preferably ≤10° C., ≤30 weight-% of inorganic mineral particles, 0.01-5 weight-% of at least one second thickener and 0.5-30 weight-% of an antiblocking agent. Further disclosed is a sheet-like product coated with the coating structure.

20 Claims, 8 Drawing Sheets

COATING STRUCTURE, SHEET-LIKE PRODUCT AND ITS USE

PRIORITY

This application is a U.S. national application of the international application number PCT/FI2018/050464 filed on Jun. 14, 2018 and claiming priority of Finnish application 20175560 filed on Jun. 15, 2017 the contents of all of which are incorporated herein by reference.

FIELD OF INVENTION

The present invention relates to a coating structure, a sheet-like product and its use according to the preambles of the enclosed independent claims.

BACKGROUND

Various coatings can be applied on the surface of paper or board in order to improve their properties. Grease barrier and water vapour barrier properties are particularly important for paper and board that are used for products for packaging purposes. Coating applied on the surface of paper or board should provide an effective barrier for leakage from the goods inside the package and/or protect the packaged goods from contamination and/or contact with the surrounding atmosphere. For packaging materials used for foodstuff and consumable liquids the barrier requirements are especially stringent.

Coatings for packaging purposes should also have good resistance for creasing and folding. The coating should not crack when the paper or board is folded into a box or wrapped around the product. Cracking may decrease or even completely destroy the barrier properties of the coating.

Furthermore, paper and board coatings should be resistant for blocking during the product manufacturing and converting processes. If the coating layer softens under high pressure and high temperature it may adhere after rewinding to the next layer on the reel and block the whole reel when cooled down. During the converting process the coating should have suitable friction properties in order to run smoothly in the process. The coating should also have appropriate glueability properties, which determine the speed and strength of a bond generated by the application of an adhesive to the coating surface, in order to be used at high speed packing lines.

Another aspect that should be satisfied is the recyclability of the package. This means for paper and board packages are after the consumption of the packed goods ideally collected for recycling, i.e. repulping. In this case the coating must also fulfil the requirements of recycling and, for example, it should not disturb the repulping process. Traditional plastic films laminated on the surface of paper or board are not necessarily easily repulpable. Thus laminated paper and board products often end up as energy waste, which is uneconomical in view of the resources.

SUMMARY OF THE INVENTION

An object of this invention is to minimise or possibly even eliminate the disadvantages existing in the prior art.

Another object of the present invention is to provide a coating structure and a sheet-like product that provide good grease and water vapour barrier properties.

An object of the present invention is to provide a coating structure that withstands cracking when creased and/or folded.

A further object of the present invention is to provide a coating structure that is suitable for coating at high coating speeds and has good runnability.

These objects are attained with the invention having the characteristics presented below in the characterising parts of the independent claims. Some preferred embodiments of the invention are presented in the dependent claims.

The embodiments mentioned in this text relate, where applicable, to all aspects of the invention, even if this is not always separately mentioned.

Typical coating structure according to the present invention for a sheet-like substrate comprising lignocellulosic fibres comprises
at least one pre-coat layer, which comprises
  (a) at least 70 weight-% of a first styrene (meth)acrylate copolymer which is polymerised in the presence of a stabiliser, and which has a glass transition temperature Tg ≤20° C., preferably ≤10° C.,
  (b) <30 weight-% of inorganic platy mineral particles, such as kaolin or talc, and
  (c) 0.01-2 weight-% of at least one first thickener; and
a top coat layer, which comprises
  (a) at least 50 weight-% of a second styrene (meth)acrylate copolymer which is polymerised in the presence of a stabiliser, and which has a glass transition temperature Tg ≤20° C., preferably ≤10° C.,
  (b) ≤30 weight-% of inorganic mineral particles,
  (c) 0.01-5 weight-% of at least one second thickener, and
  (d) 0.5-30 weight-% of antiblocking agent.

Typical sheet-like product according to the present invention comprises
a substrate comprising lignocellulosic fibres, and having a first and second parallel large surface, and
a coating structure according to the present invention applied on at least one the large surfaces of the substrate.

Now it has been surprisingly found out that the coating structure according to the invention comprising a well-defined pre-coat layer and a well-defined top-coat layer provides good resistance for cracking, even when the substrate coated with the coating structure is subjected to folding during manufacture of package. The coating structure also provides good barriers against grease and/or moisture. Furthermore, the surface of the coating structure does not adhere to adjacent coating structure surfaces when product is wound into a roll or stacked as sheets. The coating structure according to the present invention thus provides, inter alia, optimal properties for packaging and other similar purposes.

DETAILED DESCRIPTION OF THE INVENTION

Figure 1:
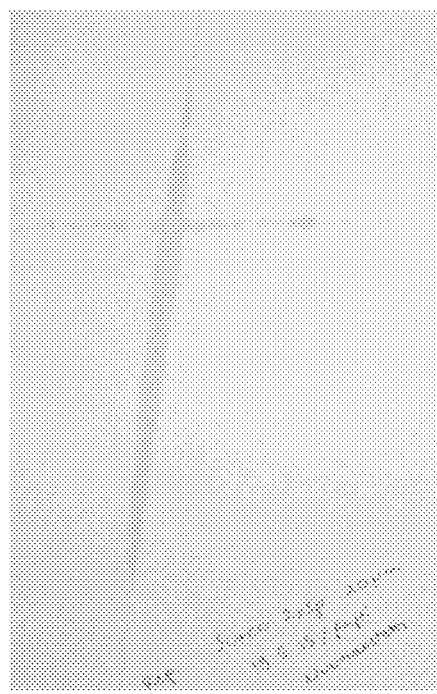
FIG. 1 shows the visual result for creased and stained sample of Reference Sample 1 described below.

In the present context, all weight-% values given for the various components in the coating layers and coating composition are calculated from the total dry solids content of the coating layer or composition.

The coating structure according to the present invention comprises at least one pre-coat layer and a top coat layer. Pre-coat layer is applied on the surface of a sheet-like substrate comprising lignocellulosic fibres. In some embodiments the surface of the sheet-like structure may be surface-sized, e.g. with hydrophobic surface size, before application of the pre-coat layer, but preferably the pre-coat layer is applied directly on the surface of a sheet-like substrate which is free from any pre-existing treatment layers. The substrate may comprise an internal size.

According to one embodiment of the invention the coating structure may comprise two or more pre-coat layers and one top-coat layer, which is applied on the outermost pre-coat layer. The individual pre-coat layers may be different from each other or identical to each other. By using a plurality of pre-coat layers it is possible to tailor the barrier properties of the coating structure by using different pre-coat layers and/or use lighter individual pre-coat layers.

According to one embodiment the coating structure consists of one or more pre-coat layers and at least one top coat layer, preferably one top coat layer, whereby the pre-coat layer or the outermost pre-coat layer and top-coat layer are immediate contact which each other. This means that there are no other layers between the pre-coat layer and the top-coat layer. The outermost pre-coat layer denotes the pre-coat layer which is furthest away from the substrate, when the coating structure comprises more than one pre-coat layer.

The pre-coat layer comprises at least 70 weight-% of a first styrene (meth)acrylate copolymer which is polymerised in the presence of a stabiliser, and which has a glass transition temperature Tg $\leq 20°$ C., preferably $\leq 10°$ C. According to one embodiment of the invention the pre-coat layer may comprise 70-99 weight-%, preferably 70-95 weight-%, more preferably 73-90 weight-%, of the first styrene (meth)acrylate copolymer. The top coat layer comprises at least 50 weight-% of a second styrene (meth) acrylate copolymer which is polymerised in the presence of a stabiliser, and which has a glass transition temperature Tg $\leq 20°$ C., preferably $\leq 10°$ C. According to one embodiment of the invention the top coat layer may comprise 50-99 weight-%, preferably 60-95 weight-%, more preferably 63-85 weight-%, of the second styrene (meth)acrylate copolymer.

The first and/or second styrene (meth)acrylate copolymer may be obtained by free radical emulsion copolymerisation of at least monomer (a), monomer (b) and an optional monomer (c) in the presence of a stabiliser, where monomer (a) is at least one optionally substituted styrene and monomer (b) is at least one C1-C4-alkyl (meth)acrylate.

According to one preferable embodiment the monomer (a) of the first and/or second styrene (meth)acrylate copolymers is selected from group comprising styrene, substituted styrenes, such as α-methylstyrene, vinyltoluene, ethylvinyltoluene, chloromethylstyrene, and any mixtures thereof. The amount of monomer (a) may be 0.1-75 weight-%, preferably 5-60 weight-%, more preferably 10-55 weight-%, calculated from the total dry solids content of the monomers (a), (b) and optional (c).

Suitable monomer (b) of the first and/or second styrene (meth)acrylate copolymers may be selected from group consisting of C1-C4-alkyl acrylates; C1-C4-alkyl methacrylates; or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. According to one preferred embodiment of the invention the monomer (b) is selected from butyl (meth)acrylates. It can comprise, for example, a mixture of at least two isomeric butyl acrylates. More preferably, the monomer component (b) is n-butyl acrylate, tert-butyl acrylate or a mixture of n-butyl acrylate and tert-butyl acrylate. The amount of monomer (b) may be 25-99.9 weight-%, preferably 30-95 weight-%, more preferably 35-90 weight-%, calculated from the total dry solids content of the monomers (a), (b) and optional (c).

According to one embodiment the first and/or second styrene (meth)acrylate copolymers originate also at least from one monomer (c), which is ethylenically unsaturated and different from monomers (a) and (b). Preferably the first and/or second styrene (meth)acrylate copolymers are carboxylated copolymers, preferably obtained by polymerising the above described monomers (a) and (b) with monomer (c), which is selected from carboxylic acid, such as acrylic acid, methacrylic acid, itaconic acid, maleic acid or styrene sulphonic acid. Acrylic acid and styrene sulphonic acid are being preferred. The amount of the optional monomer (c) may be 0.1-15 weight-%, preferably 0.1-10 weight-%, more preferably 1-5 weight-%, calculated from the total dry solids content of the monomers (a), (b) and (c). More preferably both the first and/or second styrene (meth)acrylate copolymers are carboxylated copolymers, preferably obtained by polymerizing monomer mixture comprising 1-5 weight-% of carboxylic acid.

According to one embodiment of the invention the first and second styrene (meth)acrylate copolymers are polymerised in the presence of a stabiliser, which is selected from group comprising degraded starch and polyvinyl alcohol, preferably degraded starch having average molecular weight Mn of 500 to 10 000. Degraded starch may be obtained by subjecting starch to oxidative, thermal, acidic, hydrolytic or enzymatic degradation. The oxidative degradation is presently being preferred. Hypochlorite, peroxodisulphate, hydrogen peroxide or their mixtures may be used as oxidising agents. Degraded starch, which is used in the present invention, may be any suitable degraded natural starch, such as potato, rice, corn, waxy corn, wheat, barley or tapioca starch. Starches having an amylopectin content >80%, preferably >95% are advantageous.

The polymerisation of first and second styrene (meth) acrylate copolymer may be carried out by addition of the above defined monomers, either individually or as a mixture, and the free radical initiators suitable for initiating the polymerisation, to the aqueous stabiliser solution. The polymerisation process is typically carried in the absence of oxygen, preferably in an inert gas atmosphere, for example under nitrogen. According to one embodiment of the invention the total amount of monomers in the reaction mixture is 10-92 weight-%, preferably 20-90 weight-%, more preferably 35-88 weight-%, calculated from the total dry solids content of the reaction mixture. The amount of monomers refers here to the total amount of monomers (a), (b) and optional (c), which are added to the reaction mixture during the polymerisation process.

According to one preferable embodiment of the invention that the first styrene (meth)acrylate copolymer used in the pre-coat layer and the second styrene (meth)acrylate copolymer used in the top coat layer are identical to each other.

The first and/or second styrene (meth)acrylate copolymer may have a glass transition temperature in the range of −40-+20° C., preferably −20-+10° C., more preferably −10-+10° C. The glass transition temperature ranges provide copolymers that show required barrier properties but are soft enough to withstand cracking when the substrate is creased or folded into a package.

The pre-coat layer preferably comprises inorganic platy mineral particles. In the present context platy mineral is preferably understood as an inorganic mineral, whose particles have a form factor >10. Typical examples of inorganic platy mineral particles are kaolin, talc and any of their mixtures. The platy mineral particles in the pre-coat layer and the top coat layer may be same or different, preferably the platy mineral particles in the pre-coat layer and the top coat layer are the same. Platy mineral particles are preferred as they provide improved barrier properties for the coating structure. Typically the pre-coat layer comprises ≤30 weight-% of inorganic platy mineral particles. According to one embodiment the pre-coat layer may comprise 0.1-30 weight-%, preferably 5-25 weight-%, more preferably 10-20 weight-% of inorganic platy mineral particles. Preferably the amount of the inorganic mineral particles is as high as possible as it provides not only excellent barrier properties but also cost savings.

The top-coat layer comprises inorganic mineral particles, such as platy mineral particles, porous silica particles, kaolin particles, ground calcium carbonate particles, precipitated calcium carbonate particles, or any mixture of these. The top-coat layer preferably comprises inorganic mineral particles that enhance the anti-blocking properties of the top-coat layer. Preferably, the inorganic mineral particles in the top-coat layer are selected from platy mineral particles as described above or from porous silica or kaolin particles. Typically the top coat layer comprises ≤30 weight-%, preferably ≤20 weight-% of inorganic mineral particles. The top coat layer may comprise 0.1-30 weight-%, preferably 5-25 weight-%, more preferably 5-20 weight-% of inorganic mineral particles, preferably inorganic platy mineral particles.

The inorganic mineral particles in the pre-coat layer(s) and the top-coat layer may be same or different.

The pre-coat layer comprises at least one first thickener and the top coat layer comprises at least one second thickener. The first and/or second thickener may be selected from the group comprising synthetic pH-triggered thickeners, such as alkali soluble/swellable emulsion (ASE) thickeners, hydrophobically-modified alkali soluble emulsion (HASE) thickeners, polyvinyl alcohols, ethylated polyvinyl alcohols, carboxymethyl cellulose, xanthan gum, guar gum or gum Arabic. Thickeners improve the runnability of the coating colour, especially at high coating speeds.

According to one embodiment of the invention that the first thickener and the second thickener may be different from each other, wherein the first thickener is preferably selected from synthetic thickeners, preferably from synthetic pH-triggered thickeners and the second thickener is preferably carboxymethyl cellulose.

The amount of the first thickener(s) in the pre-coat layer is typically 0.01-2 weight-%. In case of several first thickeners, this amount includes them all. According to one preferable embodiment the pre-coat layer comprises 0.1-2 weight-%, preferably 0.1-1.5 weight-%, more preferably 0.2-1 weight-% of the at least one first thickener.

The amount of the second thickener(s) in the top coat layer is typically 0.01-5 weight-%. In case of several first thickeners, this amount includes them all. According to one preferable embodiment the top coat layer comprises 0.1-5 weight-%, preferably 0.1-3 weight-%, more preferably 0.1-2 weight-% of the at least one second thickener.

The top coat layer may comprises 0.5-30 weight-%, preferably 1-30 weight-%, more preferably 1-20 weight-% or 2-20 weight-%, even more preferably 1-15 or 5-15 weight-% of an anti-blocking agent. According to one embodiment the anti-blocking agent in the top coat layer may be selected from anionic C16-C18 alkenyl ketene dimers, paraffin wax, caranauba wax, calcium stearate, polyglycerides or high density polyethylene.

Preferably the top coat layer comprises 0.5-30 weight-% of C16-C18 alkenyl ketene dimer as anti-blocking agent. The amount of anionic C16-C18 alkenyl ketene dimer in the top coat layer may be 1-30 weight-%, preferably 2-20 weight-%, more preferably 5-15 weight-%.

The pre-coat layer and/or top coat layer may comprise a crosslinker, which reacts with —OH or —COOH groups. Examples of suitable crosslinkers are, inter alia, citric acid, zirconium carbonates, glyoxal, urea formaldehyde and melamine formaldehyde. Cross-linkers make the coating layer less sensitive for water, e.g. by reducing the number of end groups available for reactions with water. Cross-linker may also improve the repulping properties of the coating structure.

According to one embodiment of the invention the coating structure may comprise a polyethylene film, which is applied on the top coat layer. Polyethylene film provides improved barrier properties, especially when the coating structure is applied on a substrate intended for liquid packaging.

According to another embodiment of the present invention the coating structure is free from any layers of laminated polymer films. This improves the repulpability of the coating structure.

The coating structure enables manufacture of various coatings, with different combinations of pre-coat layer(s) and top coat layer. The coat weights in the pre-coat layer and top coat layer can be freely chosen depending on the desired end use. According to one embodiment of the invention the pre-coat layer(s) may have a coat weight of 2-30 $g/m^2$, preferably 3-20 $g/m^2$, more preferably 5-15 $g/m^2$, and the top coat layer have a coat weight of 0.5-20 $g/m^2$, preferably 0.5-15 $g/m^2$, more preferably 0.5-10 $g/m^2$. In case the coating structure comprises a plurality of pre-coat layers the given cat weight indicates the total coat weight of all pre-coat layers.

The substrate which is coated with the coating structure is preferably a substrate comprising lignocellulosic fibres. The lignocellulosic fibres may have been obtained by any conventional pulping process, including chemical, mechanical, chemi-mechanical pulping processes. The lignocellulosic fibres may also be recycled fibres. The substrate has a first and second parallel large surface, and it is usually in form of an endless fibrous web. The substrate may have a grammage of 25-800 $g/m^2$, preferably 30-700 $g/m^2$, more preferably 40-500 $g/m^2$.

The coating structure is applied on at least one the large surfaces of the substrate by using any conventional coating techniques, such as rod coating, blade coating, spray coating or curtain coating.

According to one preferable embodiment the obtained coated product has TAPPI 559 KIT test value of at least 8, preferably at least 10, more preferably at least 12.

The KIT test value measures the repellency of the coating to oil and grease and the measurements are performed according to standard TAPPI method T-559 pm-96.

According to one preferable embodiment the obtained coated product has a mineral oil barrier HVTR value <100 $g/m^2/d$. The used Hexane Vapour Transmission Rate (HVTR) value is obtained by using test method developed by BASF. In the test hexane is placed in a measurement cup covered by barrier sample, and the evaporation of hexane through the known area is measured. The test method is commonly known for persons skilled in the art.

According to one preferable embodiment the obtained coated product has a water vapour barrier at 23° C. and 50% relative humidity WVTR value <100 $g/m^2/d$. WVTR value can be measured by using standard methods of ASTM F-1249, ISO 15105-2, ISO 15106-3, DIN 53122-2.

The product can be used for making a food service package or for liquid packaging.

EXPERIMENTAL

Reference Sample 1

Reel-to-reel coating was done using a semi-pilot coater. 130 $g/m^2$ liner board was used as substrate. Coating speed was 10 m/min and 20 μm rod was used for coating. Used coating colour contained 50% styrene acrylate binder with Tg=20° C. and 50% talc pigment (Finntalc C15, used in all the following examples).

Sample substrate was double coated with the coating colour. Coat weight was determined in oven.

Following barrier properties were tested, used standard methods given in parenthesis:
Oxygen, OTR (ASTM D3985, 23° C. 50% RH; 23° C. 80% RH)
Water vapor, WVTR (ASTM E-96, D3985 & F1927, 23° C. 50% RH)
Water, Cobb 300s (ISO 535, EN 20535 & TAPPI T 441)
Grease and oil
KIT test (TAPPI method T-559 pm-96)
Olive oil 40° C. (ISO 16235-2 & TAPPI 507 cm-99), 5 bar 170 h The obtained results are given in Table 2. Visual result for creased and stained sample is given in FIG. 1.

Reference Sample 2

Reel-to-reel coating was done using a semi-pilot coater. 130 $g/m^2$ liner board was used as substrate. Coating speed was 10 m/min and 14 μm rod was used for coating. Sample substrate was coated with a pre-coat layer and a top coat layer. Compositions of used pre-coat and top coat coating colours are shown in Table 1. Used coating colours contained styrene acrylate binder with Tg=10° C.

TABLE 1

Compositions of pre-coat coating colour and top coat coating colour for Reference Sample 1.

|  | Pre-coat (%) | Top coat (%) |
| --- | --- | --- |
| Binder, Tg = 10° C. | 66.6 | 58.4 |
| Talc | 28.6 | 25 |
| Polyvinyl alcohol (Poval 6-98) | 4.8 | 8.3 |
| AKD | — | 8.3 |

Figure 2:
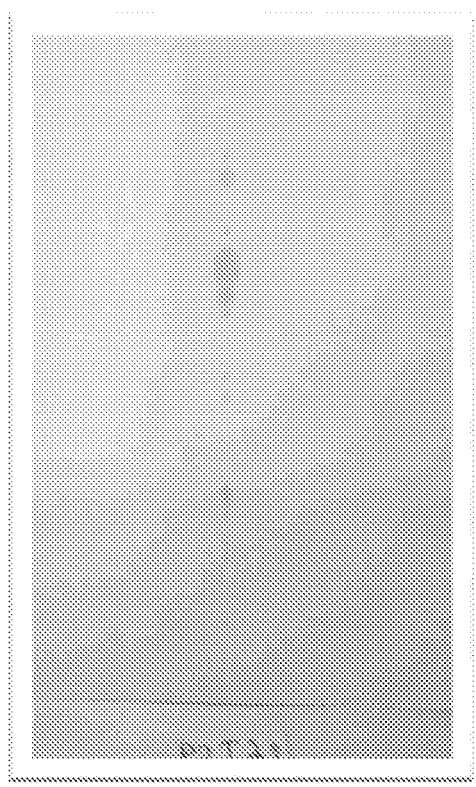
FIG. 2 shows the visual result for creased and stained sample of Reference Sample 2 described below.

The obtained results are given in Table 2. Visual result for creased and stained sample is given in FIG. 2.

TABLE 2

Obtained results for Reference Samples 1 and 2.

| Coating Property | Reference Sample 1 | Reference Sample 2 |
| --- | --- | --- |
| Coat weight (g/m2) | 19.4 | 14.8 |
| OTR 23° C. 50% RH ($cm^3/m^2$, d, bar) | 100 | 0.7 |
| WVTR 23° C. 50% RH ($g/m^2$, d) | 20 | 33.6 |
| Cobb 300 s ($g/m^2$) | 8.38 | 41 |
| KIT | 12 | 12 |
| Olive oil test | no grease penetration | 2% stained |
| HVTR ($g/m^2$*d) | — | 10 |

Coating Example 3

Used substrate was 265 $g/m^2$ folding box board. One or two barrier pre-coats were applied on the uncoated substrate by using RK K Control Coater rod coating unit. For double coated samples the pre-coat was applied by using coating rod (3) with wire diameter of 24 μm. For triple-coated samples the first pre-coat layer was applied by using coating rod (3) with wire diameter of 24 μm and the second pre-coat layer by using smooth rod (0) with wire diameter of 0.05 μm. Top coat was applied using smooth rod (0) with wire diameter of 0.05 μm and giving wet film thickness of 4 microns. Coating speed was set to 5 and drying was carried out using IR dryer for 60 seconds. Compositions of used coating colours are shown in Table 3. Used coating colours contained styrene acrylate binder with Tg=5° C.

TABLE 3

Compositions of pre-coat coating colour and top coat coating colour for Coating Example 3.

|  | Pre-coat (%) | Top Coat (%) |
|---|---|---|
| Binder, Tg 5° C. | 79.6 | 74 |
| Talc | 20 | 10 |
| Synthetic thickener, ASE type | 0.4 | — |
| AKD | — | 10 |
| Cross-linker, Potassium Zirconium carbonate | — | 5 |
| CMC (Finnfix-10) | — | 1 | pH of the pre-coat coating colour was adjusted to 8.5 using NaOH.

Simple converting test was done for the coated samples. The test included sample creasing by using Cyklos CPM 450 creasing and perforation unit, and folding by using Cobb-roller to press the fold at constant pressure. Creasing and folding was done in both machine and cross directions. Staining test was done for the folded samples by using methyl red dissolved in ethanol. Water vapor barrier properties were measured using Systech Permeation Analyzers M7002 instrument. Grease barrier properties were tested using boiled chicken fat. Fat was placed on the barrier coated side of the coated and folded FBB sample and placed at 60° C. oven for 60 minutes and photographed for evaluation of grease penetration.

Figure 3A:
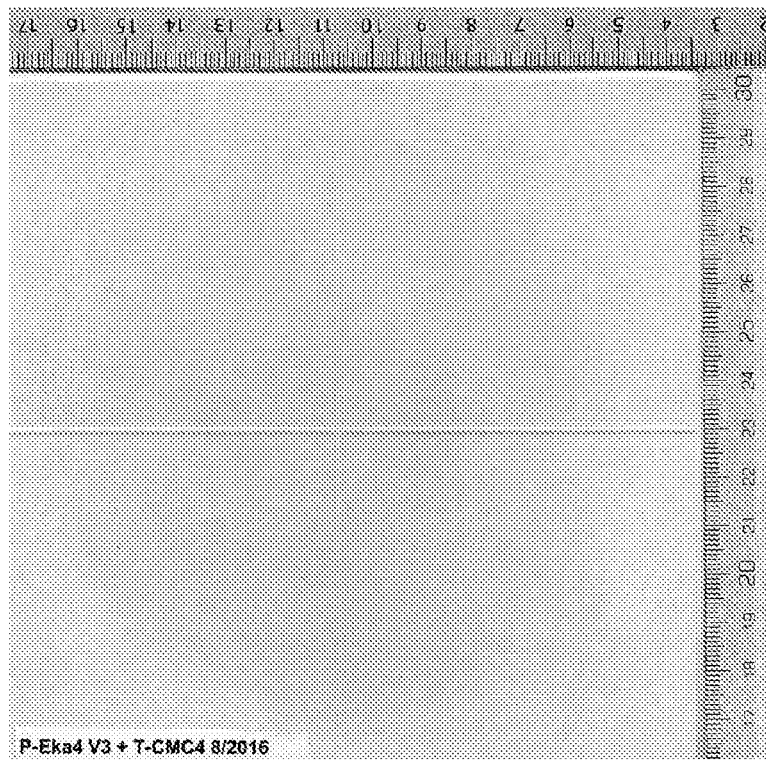
FIG. 3a shows the visual result for creased and folded and stained sample, coat weight 13.8 g/m², double-coated with a pre-coat layer by using rod 3 and a top coat layer by using rod 0 according to coating example 3 described below.
Figure 3B:
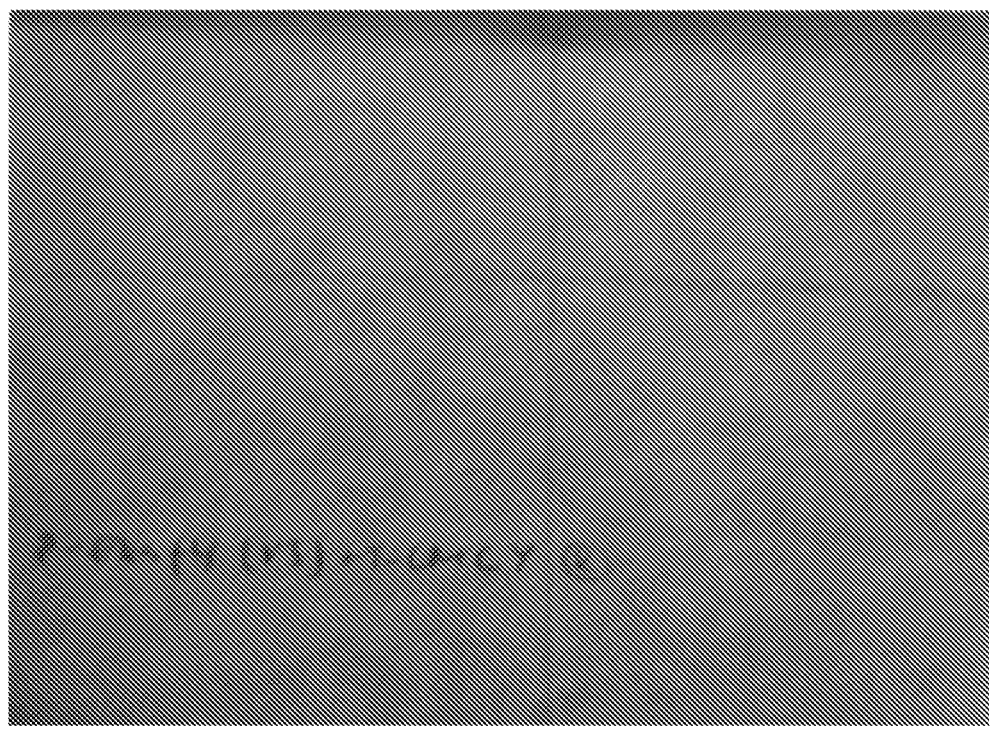
FIG. 3b. shows the visual result for chicken fat grease barrier test for a sample similar as in FIG. 3a. according to coating example 3 described below.

Visual result for creased and folded and stained sample, coat weight 13.8 g/m², double-coated with a pre-coat layer by using rod 3 and a top coat layer by using rod 0, is given in FIG. 3a. Visual result for chicken fat grease barrier test for the similar sample, coat weight 13.8 g/m², creased and folded, is given in FIG. 3b.

The obtained measured results for similar sample with coat weight 12.6 are given in Table 4.

Figure 3C:
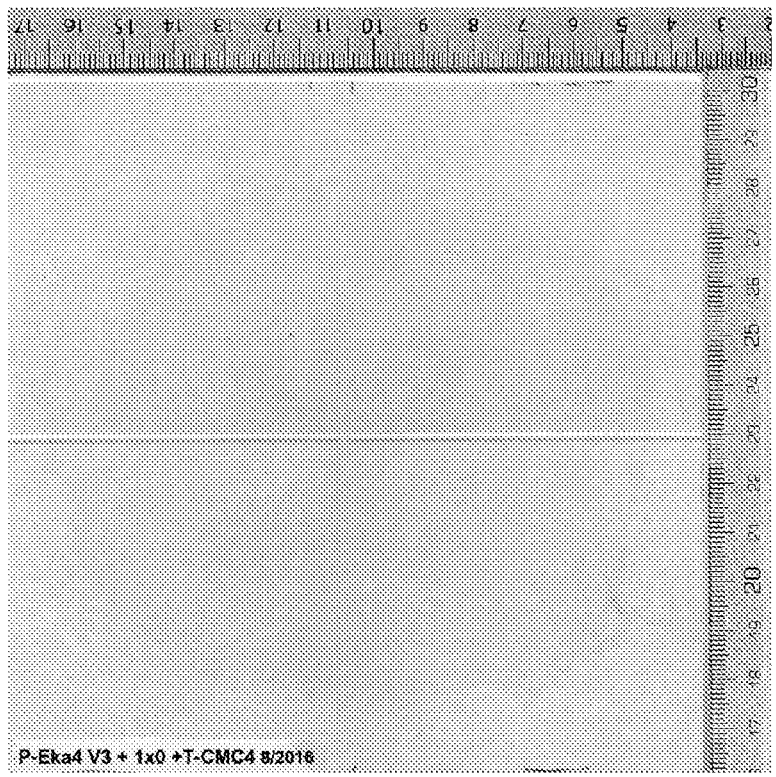
FIG. 3c. shows visual result for creased and folded and stained sample, coat weight 15.9 g/m², triple-coated with two pre-coat layers by using rods 3 and 0 and a top coat layer by using rod 0 according to coating example 3 described below.
Figure 3D:
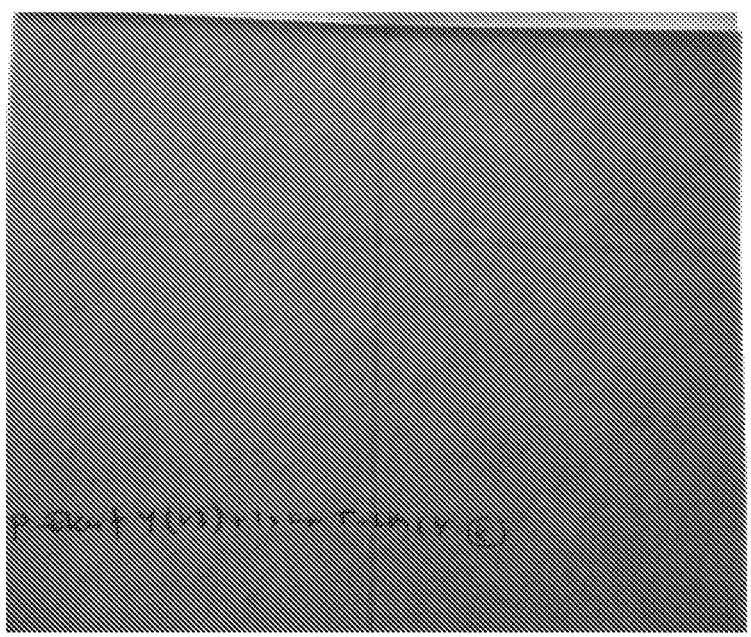
FIG. 3d shows visual result for chicken fat grease barrier test for the similar sample as in FIG. 3c according to coating example 3 described below.

Visual result for creased and folded and stained sample, coat weight 15.9 g/m², triple-coated with two pre-coat layers by using rods 3 and 0 and a top coat layer by using rod 0, is given in FIG. 3c. Visual result for chicken fat grease barrier test for the similar sample, coat weight 15.9 g/m², creased and folded, is given in FIG. 3d.

TABLE 4

Obtained results for double-coated sample of Coating Example 3.

| Coating Property | Value |
|---|---|
| Coat weight (g/m2) | 12.6 |
| WVTR 23° C. 50% RH (g/m², d) | 52.0 |
| Cobb 300 s (g/m²) | 47 |

Coating Example 4

Used substrate was 265 g/m² folding box board. Barrier pre-coat was applied on the uncoated substrate by using RK K Control Coater rod coating unit and coating rod (3) with wire diameter of 24 μm. Top coat was applied using smooth rod (0) with wire diameter of 0.05 μm and giving wet film thickness of 4 microns. Coating speed was set to 5 and drying was carried out using IR dryer for 60 seconds.

Compositions of used coating colours are shown in Table 5. Used coating colours contained styrene acrylate binder with Tg=5° C.

TABLE 5

Compositions of pre-coat coating colour and top coat coating colour for Coating Example 4.

|  | Pre-coat (%) | Top Coat (%) |
|---|---|---|
| Binder, Tg 5° C. | 79.6 | 73.2 |
| Talc | 20 | 10 |
| Synthetic thickener, HASE type | 0.4 | — |
| AKD | — | 9.9 |
| Cross-linker, Potassium Zirconium carbonate | — | 5 |
| CMC (Finnfix-10) | — | 1.9 | pH of the pre-coat coating colour was adjusted to 8.5 using NaOH.

Simple converting test was done for the samples in the same manner as described for Coating Example 3.

Figure 4A:
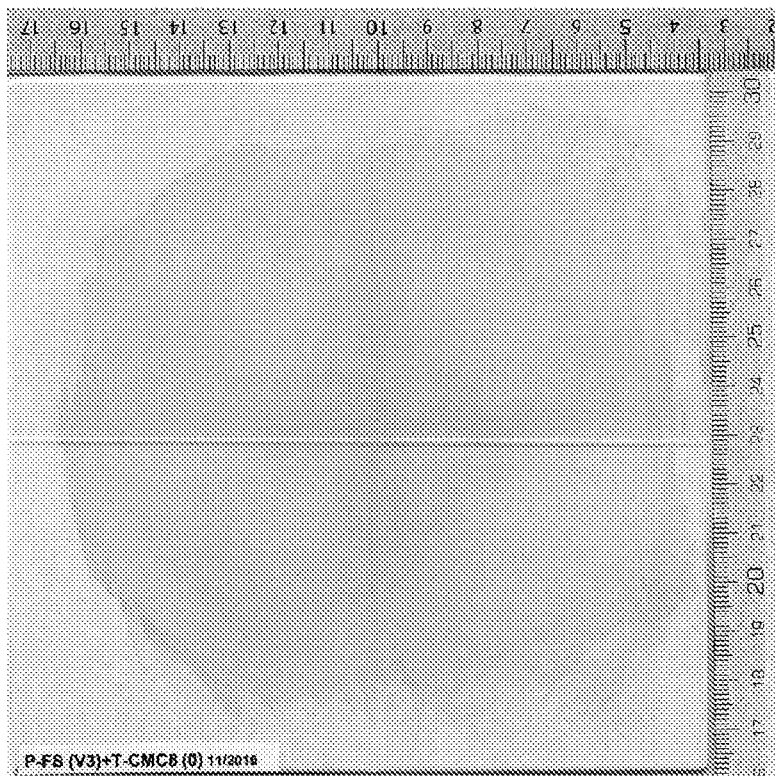
FIG. 4a shows visual result for creased and folded and stained sample, coat weight 13.8 g/m² according to coating example 4 described below.
Figure 4B:
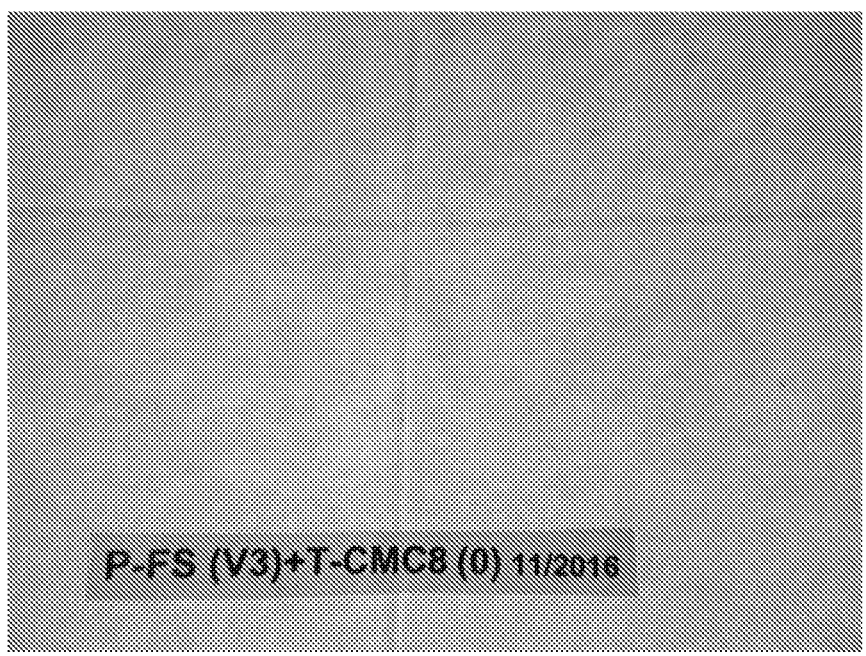
FIG. 4b shows visual results for chicken fat grease barrier test for a sample similar as in FIG. 4a according to coating example 4 described below.

Visual result for creased and folded and stained sample, coat weight 13.8 g/m², is given in FIG. 4a. Visual results for chicken fat grease barrier test for the sample, coat weight 13.8 g/m², creased and folded, is given in FIG. 4b. The obtained measured results similar sample with coat weight 11.1 g/m² are given in Table 6.

TABLE 6

Obtained results for double-coated sample of Coating Example 4.

| Coating Property | Value |
|---|---|
| Coat weight (g/m2) | 11.1 |
| WVTR 23° C. 50% RH (g/m², d) | 47.4 |
| Cobb 300 s (g/m²) | 47 |

Coating Example 5

Used substrate was 265 g/m² folding box board. Barrier pre-coat was applied on the uncoated substrate by using RK K Control Coater rod coating unit and coating rod (3) with wire diameter of 24 μm. Top coat was applied using smooth rod (0) with wire diameter of 0.05 μm and giving wet film thickness of 4 microns. Coating speed was set to 5 and drying was carried out using IR dryer for 60 seconds. Compositions of used coating colours are shown in Table 7. Used coating colours contained styrene acrylate binder with Tg=5° C.

TABLE 7

Compositions of pre-coat coating colour and top coat coating colour for Coating Example 5.

|  | Pre-coat (%) | Top Coat (%) |
|---|---|---|
| Binder, Tg 5° C. | 74.7 | 77.0 |
| Talc | 19.3 | 11 |
| Synthetic thickener, ASE type | 0.35 | — |
| AKD | — | 10.4 |
| Cross-linker, Potassium Zirconium carbonate | 5.1 | — |
| CMC (Finnfix-10) | 0.55 | 9.9 |
| ethylated polyvinyl alcohol (Exceval HR-3010) | — | 0.6 | pH of the pre-coat coating colour was adjusted to 8.5 using NaOH.

Simple converting test was done for the samples in the same manner as described for Coating Example 3.

Figure 5A:
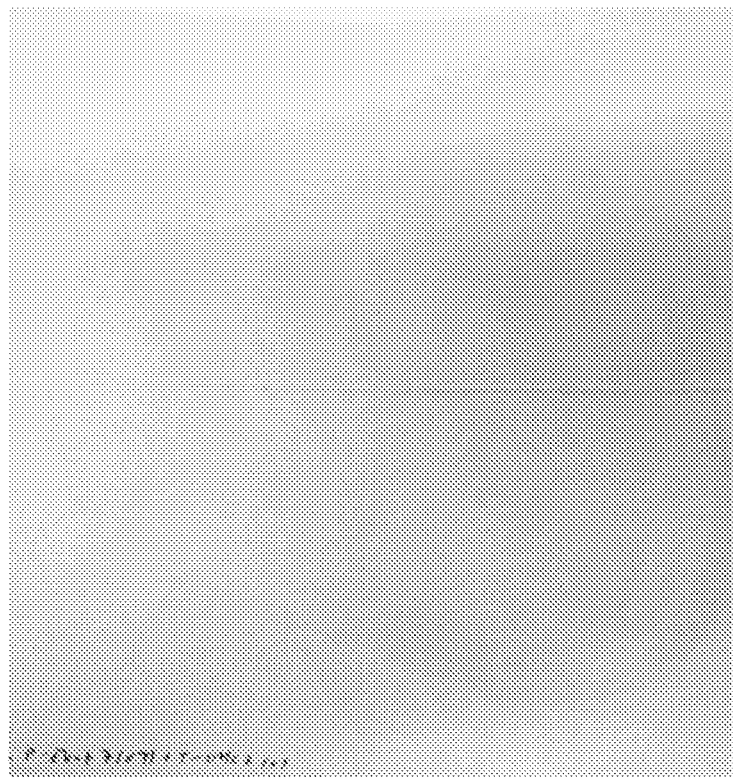
FIG. 5a shows visual results for creased and folded and stained sample, coat weight 12.5 g/m² according to coating example 5 described below.
Figure 5B:
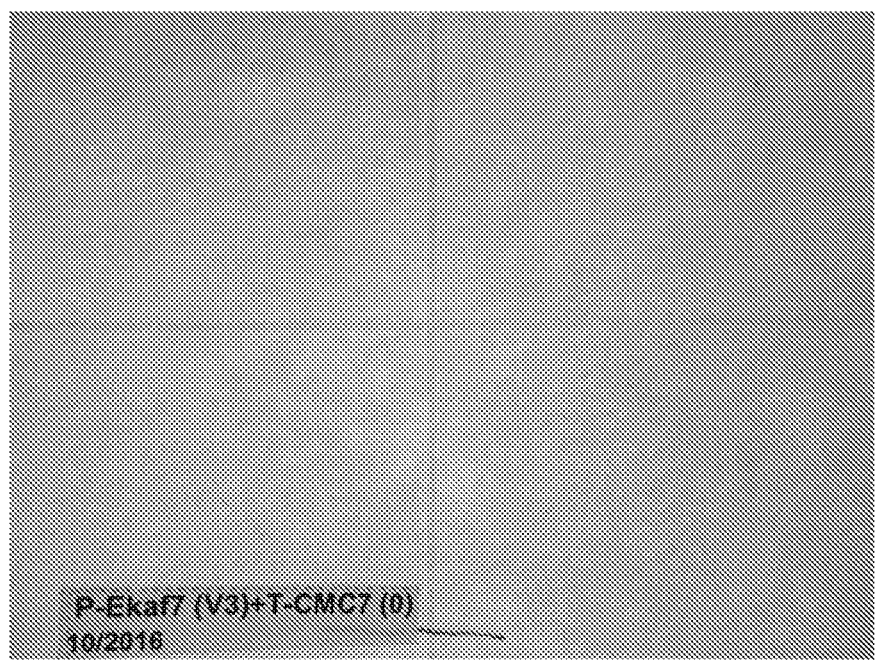
FIG. 5b shows visual results for chicken fat grease barrier test for a sample similar as in FIG. 5a according to coating example 5 described below.

Visual results for creased and folded and stained sample, coat weight 12.5 g/m², is given in FIG. 5a. Visual results for chicken fat grease barrier test for the sample, coat weight 12.5 g/m², creased and folded, is given in FIG. 5b. The obtained measured results for similar sample, coat weight 10.6 g/m², are given in Table 8.

TABLE 8

Obtained results for double-coated sample of Coating Example 5.

| Coating Property | Value |
|---|---|
| Coat weight (g/m²) | 10.6 |
| WVTR 23° C. 50% RH (g/m², d) | 55.0 |
| Cobb 300 s (g/m²) | 50 |

Coating Example 6

Used substrate was 265 g/m² folding box board. Barrier pre-coat was applied on the uncoated substrate by using RK K Control Coater rod coating unit and coating rod (3) with wire diameter of 24 μm. Top coat was applied using smooth rod (0) with wire diameter of 0.05 μm and giving wet film thickness of 4 microns. Coating speed was set to 5 and drying was carried out using IR dryer for 60 seconds. Compositions of used coating colours are shown in Table 9. Used coating colours contained styrene acrylate binder with Tg=5° C.

TABLE 9

Compositions of pre-coat coating colour and top coat coating colour for Coating Example 6.

| | Pre-coat (%) | Top Coat (%) |
|---|---|---|
| Binder, Tg 5° C. | 89.6 | 64.1 |
| Talc | 10 | 19.9 |
| Synthetic thickener, ASE type | 0.4 | — |
| AKD | — | 9.9 |
| Cross-linker, Potassium Zirconium carbonate | — | 4.9 |
| CMC (Finnfix-10) | — | 1.2 |

Simple converting test was done for the samples in the same manner as described for Coating Example 3.

Figure 6A:
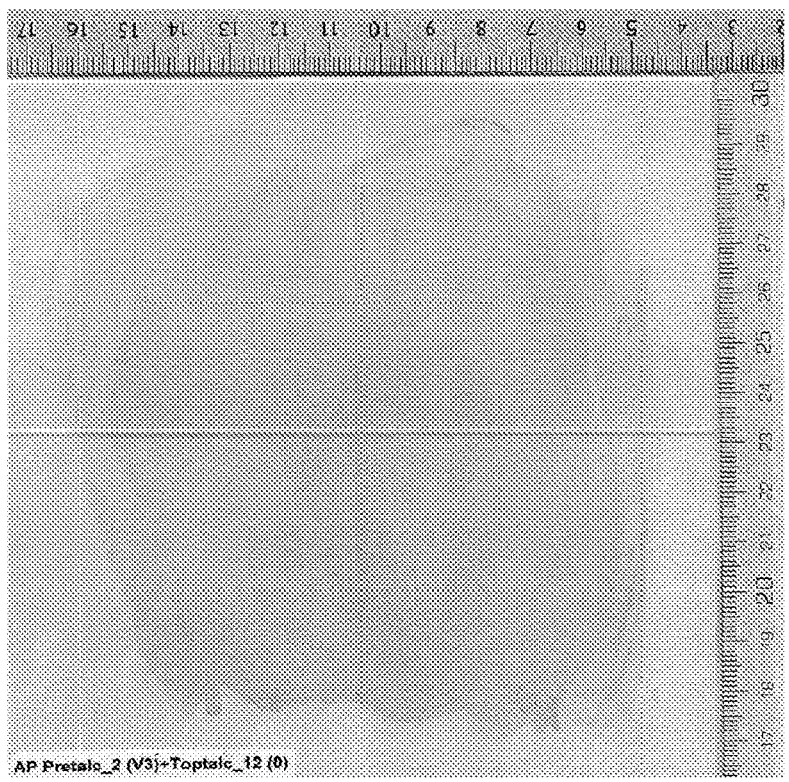
FIG. 6a shows visual results for creased and folded and stained sample according to coating example 6 described below.

Visual result for creased and folded and stained sample is given in FIG. 6a.

Figure 6B:
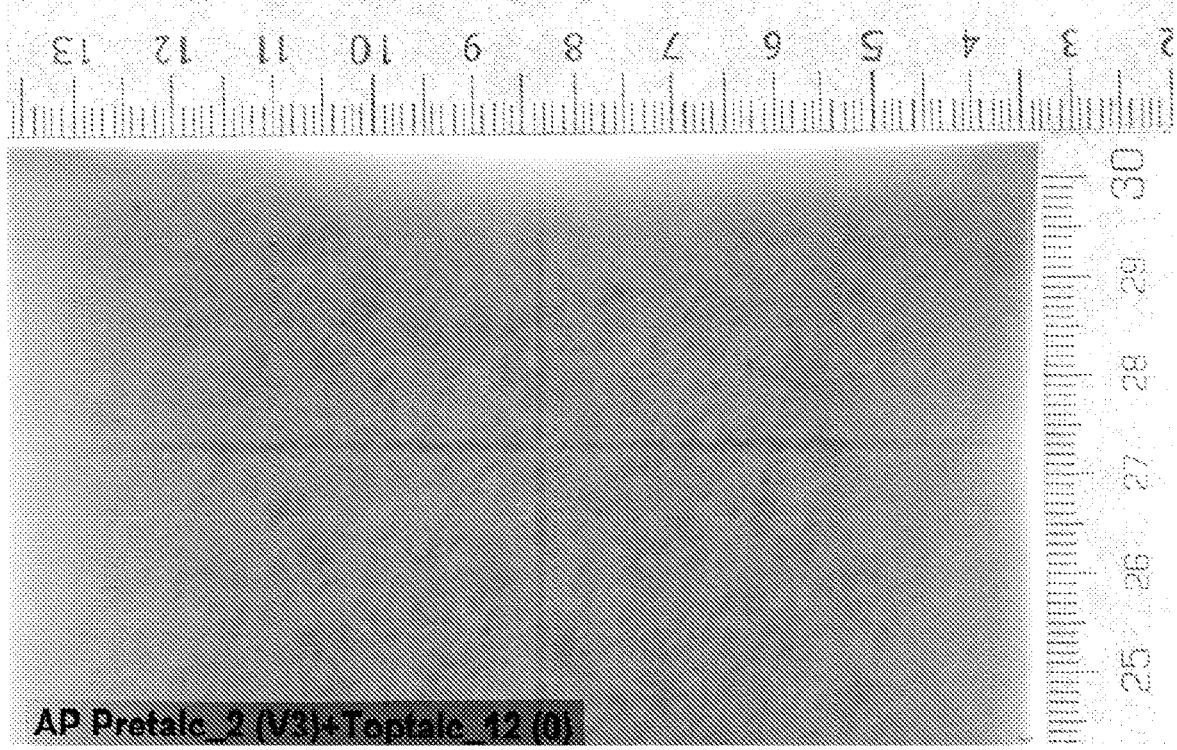
FIG. 6b. shows visual results for chicken fat grease barrier test for a sample similar as in FIG. 6a according to coating example 6 described below.

Visual result for chicken fat grease barrier test for the sample, creased and folded, is given in FIG. 6b. The obtained measured results for similar sample are given in Table 10.

TABLE 10

Obtained results for double-coated sample of Coating Example 6.

| Coating Property | Value |
|---|---|
| Coat weight (g/m²) | 9.8 |
| WVTR 23° C. 50% RH (g/m², d) | 60.6 |
| Cobb 300 s (g/m²) | 49 |

Coating Example 7

Used substrate was 235 g/m² folding box board. Barrier pre-coat was applied on the uncoated substrate by using RK K Control Coater rod coating unit and coating rod (3) with wire diameter of 24 μm. Top coat was applied using smooth rod (0) with wire diameter of 0.05 μm and giving wet film thickness of 4 microns. Coating speed was set to 5 and drying was carried out using IR dryer for 60 seconds. Compositions of used coating colours are shown in Table 11. Used coating colours contained carboxylated styrene acrylate binder with Tg=10° C.

TABLE 11

Compositions of pre-coat coating colour and top coat coating colour for Coating Example 7.

| | Pre-coat (%) | Top Coat (%) |
|---|---|---|
| Binder, Tg 10° C. | 79.6 | 74.1 |
| Talc | 20 | 9.9 |
| Synthetic thickener, ASE type | 0.4 | — |
| AKD | — | 9.9 |
| Cross-linker, Potassium Zirconium carbonate | — | 4.9 |
| CMC (Finnfix-10) | — | 1.2 |

Simple converting test was done for the samples in the same manner as described for Coating Example 3.

Figure 7A:
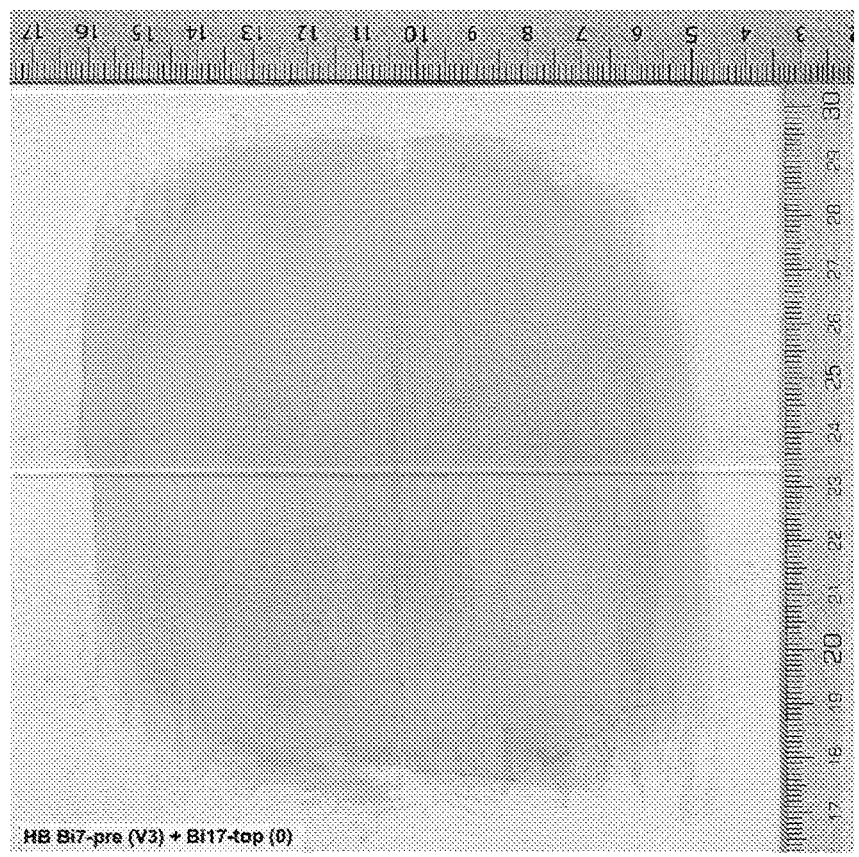
FIG. 7a. shows visual results for creased and folded and stained sample according to coating example 7 described below.
Figure 7B:
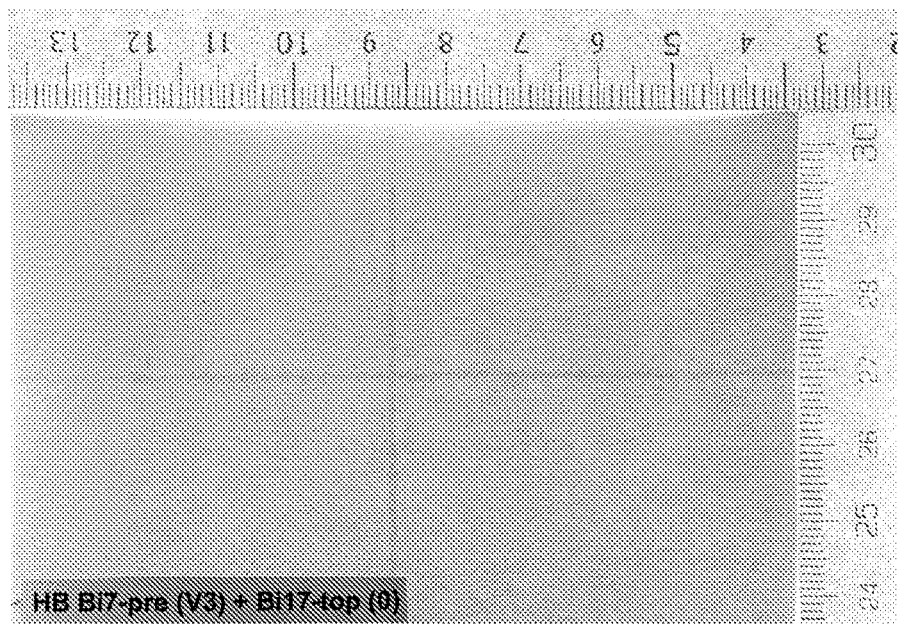
FIG. 7b shows visual results for chicken fat grease barrier test for a sample similar as in FIG. 7a according to coating example 7 described below.

Visual results for creased and folded and stained sample are given in FIG. 7a. Visual results for chicken fat grease barrier test for the sample, creased and folded, is given in FIG. 7b. The obtained measured results the same sample are given in Table 12.

TABLE 12

Obtained results for double-coated sample of Coating Example 7.

| Coating Property | Value |
|---|---|
| Coat weight (g/m²) | 10.6 |
| WVTR 23° C. 50% RH (g/m², d) | 55.0 |
| Cobb 300 s (g/m²) | 50 |

Coating Example 8

Used substrate was 265 g/m² folding box board. Barrier pre-coat was applied on the uncoated substrate by using RK K Control Coater rod coating unit and coating rod (3) with wire diameter of 24 μm. Top coat was applied using smooth rod (0) with wire diameter of 0.05 μm and giving wet film thickness of 4 microns. Coating speed was set to 5 and drying was carried out using IR dryer for 60 seconds. Compositions of used coating colours are shown in Table 13. Used coating colours contained styrene acrylate binder with Tg=5° C.

TABLE 13

Compositions of pre-coat coating colour and top coat coating colour for Coating Example 8.

| | Pre-coat (%) | Top Coat (%) |
|---|---|---|
| Binder, Tg ° C. | 79.6 | 78.8 |
| Talc | 20 | 10 |
| Synthetic thickener, ASE type | 0.4 | — |
| Carnauba wax | — | 5 |
| Cross-linker, Potassium Zirconium carbonate | — | 5 |
| CMC (Finnfix-10) | — | 1.2 |

Simple converting test was done for the samples in the same manner as described for Coating Example 3.

The obtained measured results the same sample are given in Table 14.

TABLE 14

Obtained results for double-coated sample of Coating Example 8.

| Coating Property | Value |
|---|---|
| Coat weight (g/m²) | 12.2 |
| WVTR 23° C. 50% RH (g/m², d) | 55.9 |
| Cobb 300 s (g/m²) | 49 |

Coating Example 9

Used substrate was 265 g/m² folding box board. Barrier pre-coat was applied on the uncoated substrate by using RK K Control Coater rod coating unit and coating rod (3) with wire diameter of 24 μm. Top coat was applied using smooth rod (0) with wire diameter of 0.05 μm and giving wet film thickness of 4 microns. Coating speed was set to 5 and drying was carried out using IR dryer for 60 seconds. Compositions of used coating colours are shown in Table 15. Used coating colours contained styrene acrylate binder with Tg=5° C.

TABLE 15

Compositions of pre-coat coating colour and top coat coating colour for Coating Example 9.

| | Pre-coat (%) | Top Coat (%) |
|---|---|---|
| Binder, Tg 5° C. | 74.5 | 70.2 |
| Talc | 20 | 9.2 |
| Synthetic thickener, ASE type | 0.4 | — |
| AKD | — | 9 |
| Cross-linker, Potassium Zirconium carbonate | — | 5.1 |
| CMC (Finnfix-10) | — | 1.4 |
| PEG 300 | 4.95 | 5.1 |

Simple converting test was done for the samples in the same manner as described for Coating Example 3.

Figure 8A:
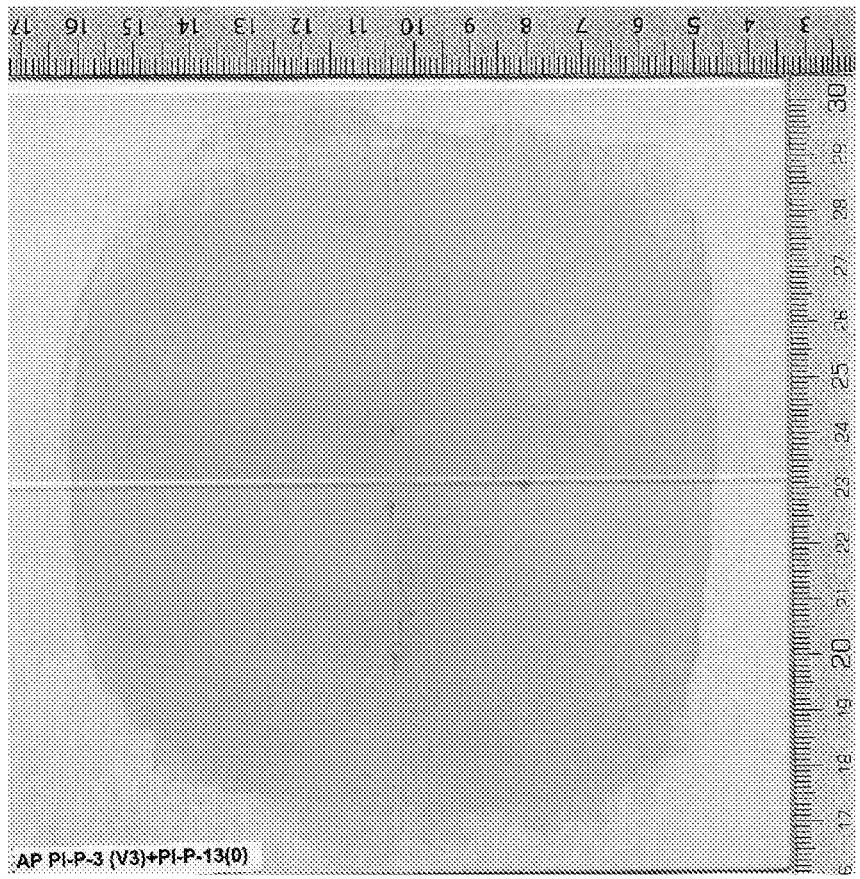
FIG. 8a shows visual results for creased and folded and stained sample according to coating example 9 described below.

Visual result for creased and folded and stained sample is given in FIG. 8a.

Figure 8B:
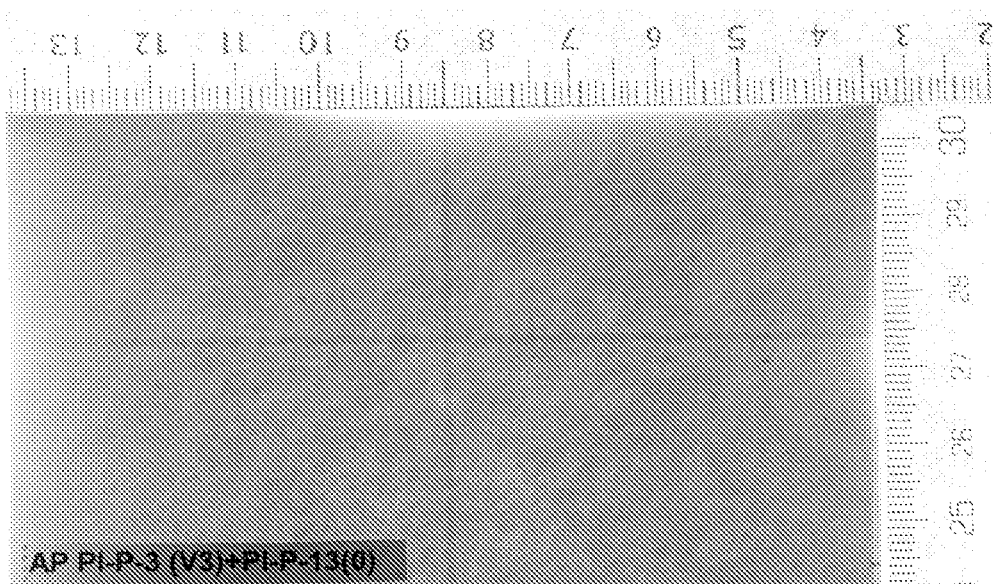
FIG. 8b shows visual results for chicken fat grease barrier test for a sample similar as in FIG. 8a according to coating example 9 described below.

Visual result for chicken fat grease barrier test for the sample, creased and folded, is given in FIG. 8b. The obtained measured results for similar sample are given in Table 16.

TABLE 16

Obtained results for double-coated sample of Coating Example 9.

| Coating Property | Value |
|---|---|
| Coat weight (g/m²) | 14.5 |
| WVTR 23° C. 50% RH (g/m², d) | 47.5 |
| Cobb 300 s (g/m²) | 44 |

In order to develop barrier coatings for fibre based packagings it is not sufficient to only look at properties of the coating as a flat surface. Barrier coated products will go through a converting process and therefore it is crucial for the coating to remain intact during the creasing and folding processes. The examples above show that the reference samples with good barrier properties cannot be commercially used as the barrier coating cracks at fold and loses the barrier properties it had as flat sample. The coating examples 3-9 show that different coating formulations according to the invention can provide a combination of good barrier and good converting properties. Product can be double or multilayer coated. The disclosed coating structures provide especially improved grease and water vapour barrier properties.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A coating structure for a sheet-like substrate comprising lignocellulosic fibres, the structure comprising:
   at least one pre-coat layer comprising:
   (a) at least 70 weight-% of a first styrene (meth)acrylate copolymer polymerized in the presence of a stabilizer, said first styrene (meth)acrylate copolymer having a glass transition temperature Tg≤20° C.,
   (b) 5-25 weight-% of inorganic platy mineral particles of kaolin, talc, or any of their mixtures, and
   (c) 0.01-2 weight-% of at least one first thickener; and
   a top coat layer comprising:
   (a) at least 50 weight-% of a second styrene (meth)acrylate copolymer polymerized in the presence of a stabilizer, said second styrene (meth)acrylate copolymer having a glass transition temperature Tg≤20° C.,
   (b) ≤30 weight-% of inorganic mineral particles,
   (c) 0.01-5 weight-% of at least one second thickener, and
   (d) 0.5-30 weight-% of an antiblocking agent.

2. The coating structure according to claim 1, wherein the pre-coat layer comprises:
   (a) 70-95 weight-% of the first styrene (meth)acrylate copolymer, and/or
   (b) 10-20 weight-% of inorganic platy mineral particles, and/or
   (c) 0.1-1.5 weight-% of the at least one first thickener.

3. The coating structure according to claim 1, wherein the top-coat layer comprises:
   (a) 50-99 weight-% of the second styrene (meth)acrylate copolymer, and/or
   (b) 5-20 weight-% of inorganic mineral particles, and/or
   (c) 0.1-5 weight-% and/or
   (d) 1-30 weight-% of anti-blocking agent.

4. The coating structure according to claim 1, wherein the anti-blocking agent is selected from C16-C18 alkenyl ketene dimers, paraffin wax, caranauba wax, calcium stearate, polyglycerides or high density polyethylene.

5. The coating structure according to claim 1, wherein the styrene (meth)acrylate copolymer is polymerized in the presence of a stabilizer selected from starch and polyvinyl alcohol.

6. The coating structure according to claim 1, wherein the styrene (meth)acrylate copolymer is a carboxylated copolymer, obtained by polymerizing a monomer mixture comprising 1-5 weight-% of carboxylic acid.

7. The coating structure according to claim 1, wherein the first and/or the second styrene (meth)acrylate copolymer has a glass transition temperature in a range of −40-20° C.

8. The coating structure according to claim 7, wherein the first and/or the second styrene (meth)acrylate copolymer has a glass transition temperature in a range of −20-10 ° C.

9. The coating structure according to claim 8, wherein the first and/or the second styrene (meth)acrylate copolymer has a glass transition temperature in a range of −10-10° C.

10. The coating structure according to claim 1, wherein the first styrene (meth)acrylate copolymer and the second styrene (meth)acrylate copolymer are identical to each other.

11. The coating structure according to claim 1, wherein the at least one first and/or the at least one second thickener are selected from the group consisting of synthetic pH-triggered thickeners, polyvinyl alcohols, ethylated polyvinyl alcohols, carboxymethyl cellulose, xanthan gum, guar gum and gum Arabic.

12. The coating structure according to claim 1, wherein the at least one first thickener and the at least one second thickener are different from each other.

13. The coating structure according to claim 1, wherein the pre-coat layer and/or the top coat layer comprises a cross-linker reacting with —OH or —COOH groups.

14. The coating structure according to claim 1, wherein the structure comprises two or more pre-coat layers and one top-coat layer applied on the outermost pre-coat layer.

15. The coating structure according to claim 1, further comprising a polyethylene film applied on the top coat layer.

16. The coating structure according to claim 1, wherein the pre-coat layer has a coat weight of 2-30 $g/m^2$, and the top coat layer has a coat weight of 0.5-20 $g/m^2$.

17. A sheet-like product comprising:
  a substrate comprising lignocellulosic fibres, and having a first parallel large surface and a second parallel large surface, and
  a coating structure according to claim 1 applied on at least one of the large surfaces of the substrate.

18. The product according to claim 17, wherein the substrate has a grammage of 25-800 $g/m^2$.

19. The product according to claim 17, wherein the product has KIT test value of at least 8, mineral oil barrier HVTR value <100 $g/m^2/d$, and/or water vapour barrier VWTR value <100 $g/m^2/d$.

20. The product according to claim 17, wherein the product is a food service package.

* * * * *